(12) United States Patent
Page

(10) Patent No.: US 9,052,161 B2
(45) Date of Patent: Jun. 9, 2015

(54) PERSPECTIVE TRACKING SYSTEM

(75) Inventor: David Page, Cocoa, FL (US)

(73) Assignee: Raydon Corporation, Port Orange, FL (US)

(*) Notice: Subject to any disclaimer, the term of this patent is extended or adjusted under 35 U.S.C. 154(b) by 1985 days.

(21) Appl. No.: 11/641,123

(22) Filed: Dec. 19, 2006

(65) Prior Publication Data
US 2007/0166669 A1   Jul. 19, 2007

Related U.S. Application Data

(60) Provisional application No. 60/751,298, filed on Dec. 19, 2005.

(51) Int. Cl.
G09B 9/00   (2006.01)
F41G 3/26   (2006.01)
(Continued)

(52) U.S. Cl.
CPC .............. *F41G 3/2605* (2013.01); *F41A 33/00* (2013.01); *F41G 3/26* (2013.01); *F41G 3/2661* (2013.01); *F41J 5/02* (2013.01); *F41J 9/00* (2013.01); *F41J 9/08* (2013.01); *G06F 3/0346* (2013.01); *G06F 17/30825* (2013.01);
(Continued)

(58) Field of Classification Search
CPC ......... F41A 33/00; F41G 3/26; F41G 3/2661; F41J 5/02; F41J 9/00; F41J 9/08; G06F 3/346; G06F 17/30825; G06F 17/30831; G09B 9/006
USPC ........................... 434/11, 16, 19, 21; 345/157
See application file for complete search history.

(56) References Cited

U.S. PATENT DOCUMENTS 3,996,590 A * 12/1976 Hammack ...................... 342/465
4,409,899 A * 10/1983 Owen et al. ..................... 434/16
(Continued)

FOREIGN PATENT DOCUMENTS

| EP | 1 260 828 A2 | 11/2002 |
| JP | 61-183718 | 8/1986 |
| JP | 2005114588 | 4/2005 |

OTHER PUBLICATIONS

Hardin, R. Winn. IR cameras match machine-vision needs. Vision Systems Design. May 2004, vol. 9 Issue 5, p. 55-60. 5p. 3 Color Photographs. (Retrieved online Feb. 9, 2015, from Ebsco).*
(Continued)

*Primary Examiner* — Nikolai A Gishnock
(74) *Attorney, Agent, or Firm* — Sterne, Kessler, Goldstein & Fox P.L.L.C.

(57) ABSTRACT

Resolution of perspective in three dimensions is necessary for intermeshing real players into simulated environments during virtual training exercises. A combination of small sized sensors and image recognition tracking algorithms allows the tracking element to be placed directly on the device whose perspective is desired. This provides a solution to determining perspective as it provides a direct measurement from the center axis of the observer. This invention employs a perspective tracking device to determine a point-of-gaze or a point-of-aim in a three-dimensional space to a high degree of accuracy. Point-of-gaze may be used to determine views for head mounted displays and aim-points for weapons. The invention may operate in an unconstrained space allowing simulation participants to operate in a larger, open environment. Areas of interest in the environment are bounded by emitters which identify the region and its physical constraints.

15 Claims, 6 Drawing Sheets

(51) Int. Cl.
*F41J 5/00* (2006.01)
*F41J 5/02* (2006.01)
*F41J 9/00* (2006.01)
*F41J 9/08* (2006.01)
*F41A 33/00* (2006.01)
*G01S 5/16* (2006.01)
*G09B 19/00* (2006.01)
*G06F 3/0346* (2013.01)
*G06F 17/30* (2006.01)

(52) U.S. Cl.
CPC ......... *G06F 17/30831* (2013.01); *G09B 9/006*
(2013.01); *G01S 5/163* (2013.01); *G09B 19/00*
(2013.01)

(56) References Cited

U.S. PATENT DOCUMENTS

| | | | |
|---|---|---|---|
| 5,215,465 A | 6/1993 | Marshall et al. | |
| 5,320,534 A | 6/1994 | Thomas | |
| 5,471,542 A | 11/1995 | Ragland | |
| 5,816,817 A * | 10/1998 | Tsang et al. | 434/22 |
| 5,835,077 A * | 11/1998 | Dao et al. | 345/157 |
| 5,870,136 A | 2/1999 | Fuchs et al. | |
| 5,874,938 A * | 2/1999 | Marten | 345/156 |
| 5,889,505 A * | 3/1999 | Toyama et al. | 345/157 |
| 5,988,645 A * | 11/1999 | Downing | 273/348 |
| 6,296,486 B1 | 10/2001 | Cardaillac et al. | |
| 6,330,373 B1 | 12/2001 | McKinney et al. | |
| 6,473,980 B2 * | 11/2002 | Ripingill et al. | 33/506 |
| 6,604,064 B1 * | 8/2003 | Wolff et al. | 434/23 |
| 7,239,301 B2 * | 7/2007 | Liberty et al. | 345/158 |
| 7,329,127 B2 * | 2/2008 | Kendir et al. | 434/21 |
| 8,303,405 B2 * | 11/2012 | Zalewski et al. | 345/157 |
| 2002/0158815 A1 | 10/2002 | Zwern | |
| 2002/0196343 A1 | 12/2002 | Navab et al. | |
| 2004/0113885 A1 | 6/2004 | Genc et al. | |
| 2004/0119662 A1 | 6/2004 | Dempski | |
| 2004/0136567 A1 | 7/2004 | Billinghurst | |
| 2004/0201857 A1 | 10/2004 | Foxlin | |
| 2006/0005447 A1 | 1/2006 | Lenner et al. | |
| 2007/0152157 A1 * | 7/2007 | Page | 250/340 |
| 2007/0166669 A1 * | 7/2007 | Page | 434/21 |
| 2007/0238073 A1 * | 10/2007 | Portoghese et al. | 434/21 |
| 2008/0306708 A1 * | 12/2008 | Germain et al. | 702/153 |
| 2009/0267895 A1 * | 10/2009 | Bunch | 345/157 |

OTHER PUBLICATIONS

English Language Abstract of JP 61-183718 (1986) Patent Abstracts of Japan (listed on accompanying PTO/SB08A as document FP1).
English Language Abstract of JP 2005114588 (2005) Patent Abstracts of Japan (listed on accompanying PTO/SB08A as document FP3).

* cited by examiner

PERSPECTIVE TRACKING SYSTEM

This application claims the benefit of U.S. Provisional Application 60/751,298, filed on Dec. 19, 2005, and incorporated herein by reference in its entirety.

BACKGROUND OF THE INVENTION

1. Field of the Invention

This invention relates to perspective tracking.

2. Background Art

With the advancements in simulated environment, virtual training has become a possibility. Virtual participation in these simulated environments cannot fully replicate real participation correctly, due to the lack of free motion in virtual participation solutions. Real participation introduces the problem of tracking the movement and perspective of the real participants in the simulated environment. What is needed is a solution for determining perspective of the real participant in the simulated environment.

BRIEF SUMMARY OF THE INVENTION

The use of video tracking to derive motion in two dimensions is well established for easily distinguishable targets in a video field. This invention builds on the tracking of point light emitters to locate regions of interest in a field of view where high accuracy of aim-point and positional information are both needed. A single perspective tracking device (PTD) captures a continuous image stream of its current field of view. As point light emitters enter the field of view, a track is built up for each, and the identity of each emitter is derived from the detected modulation patterns of each. These emitter identities are used to identify an area of interest and to determine the perspective of the PTD. Successive images and tracks are used to build up motion formulae for six degrees of freedom (6DOF) in real time. This system may be used for determining a point-of-gaze for head-mounted displays (HMDs), point-of-aim for simulated weapons, and may be used for robotic control in open spaces.

The PTD represents one of two components that work in unison to provide high accuracy orientation/perspective measurements. In some implementations, the PTD is a high resolution infrared (IR) video tracker which is used to detect infrared point light emitters and accurately identify their angular relationship from the center of the field of view. The second component is an area of interest marker (AIM). In some embodiments of the invention, an AIM would include a single microprocessor with multiple infrared point light emitters attached. These AIMs serve as reference points as to position and perspective. A set of AIMs (one or more) may delineate an area of interest (AOI). Such a set of AIMs is treated as a group, or a single track point array (TPA), for certain processing operations to be described below. In some embodiments of the invention, only some of the emitters are attached to AIMs. In such embodiments, some of the emitters in the system exist apart from any AIM.

The PTD may include an infrared-sensitive image capture device coupled to a processing array that detects points in the field of view that match the criteria for AIM emitters. For each AIM emitter the processing array of the PTD detects a match for the AIM emitter and uses the pixel values which compose the image to compute a center of light for that emitter. The center of light is analogous to a center of mass for a physical object, but represents a single averaged location for the emitted light energy. This center of light calculation is performed for each emitter in the captured frame, yielding a mathematical centroid. The PTD translates each centroid into an angular measurement offset in the horizontal ($\alpha$) and vertical ($\beta$) axis. These angles are corrected based on tables stored in the PTD to compensate for spherical asymmetries inherent in the lens systems used in digital imaging systems. The corrected offsets are denoted as $\alpha'$ and $\beta'$ respectively. Standard tracking sorting algorithms are utilized to re-identify each AIM emitter on successive frames of video and generate a history table for each emitter, or point. These histories are utilized to generate an angular path formula for each point on an on-going basis. Once a point path is determined (i.e., track lock is obtained), the location and path of an emitter is extrapolated (persisted or coasted) on frames when the corresponding AIM emitter may not be located. Lists of points, along with motion formula coefficients, are used in the PTD, thereby determining AIM identity and orientation. The identity of the AIM is used to look up physical characteristics (such as the size and shape of a surface marked by the AIM), which are then used to compute distance of the observer to the AIM field as well as exact angles. For example, a minimum of three point sources (AIMs) are needed to describe a two dimensional surface. For a rectangular surface that is three feet by four feet, we only need to know that the shape is a rectangle and the physical coordinates of the three AIMs to derive the fourth corner and, therefore, an aim-point within the enclosed area. When the separation of these points in video space is considered, and the rectangle is fitted to them, distance and incident angle can be determined.

In some embodiments of the invention, the computed perspective is returned on a frame by frame basis to a visuals control system that uses the perspective to update a user's view through the AIMs. This updated data is conveyed to users via either a tethered hardware system or a wireless communication system.

BRIEF DESCRIPTION OF THE DRAWINGS/FIGURES

DETAILED DESCRIPTION OF THE INVENTION

Embodiments of the present invention are now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications other than those disclosed here.

Figure 1:
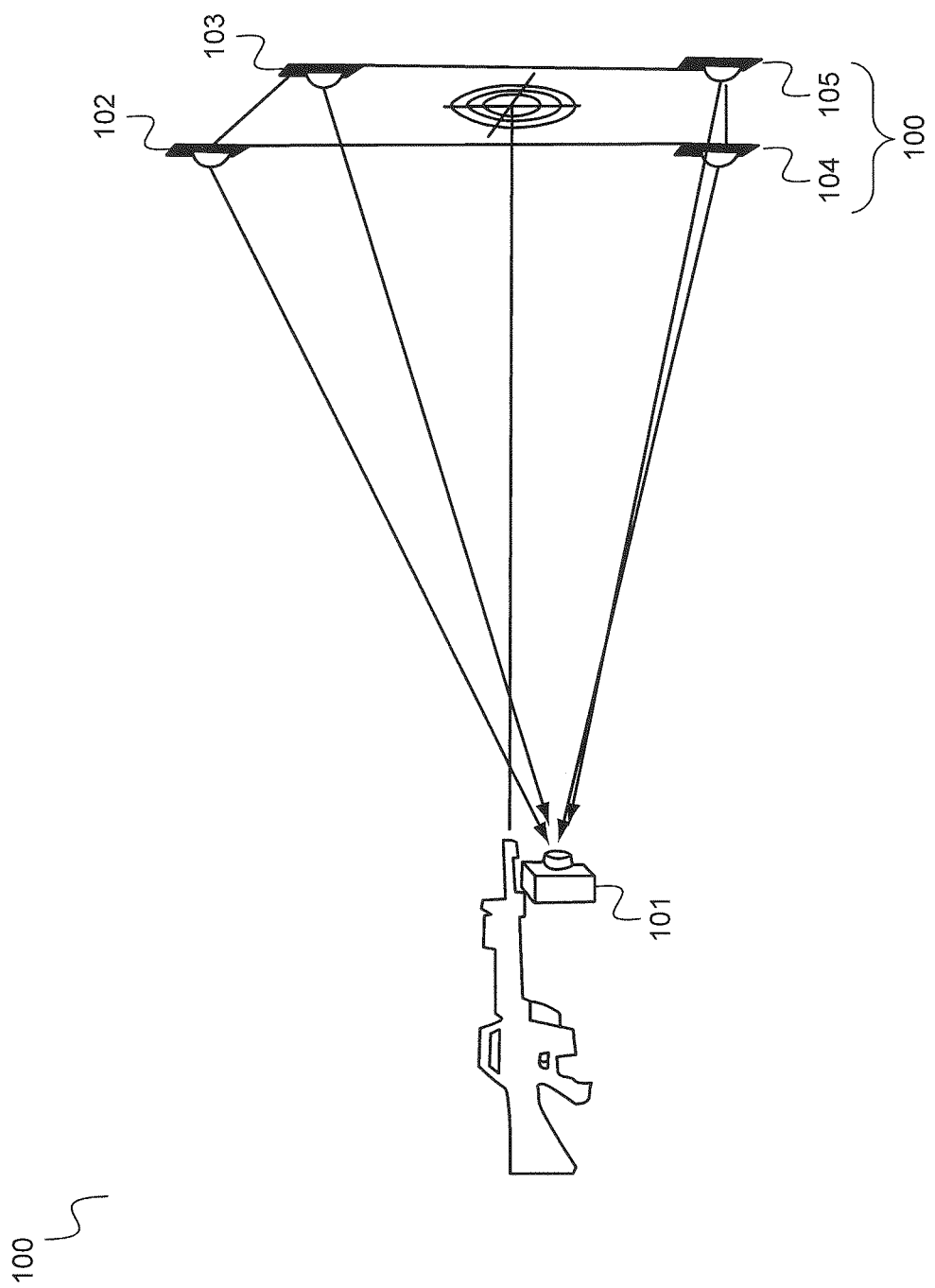
FIG. 1 illustrates a track point array that is detected and tracked by a perspective tracking device, according to an embodiment of the invention.

An embodiment of the invention is based on the detection of an array of emitters on a fixed plane in space. In FIG. 1 we see a depiction of the basic arrangement which may be repeated multiple times in, for example, a training environment. The array of emitters (102-105) define a single AOI (106), and are detected using a PTD (101).

Figure 2:
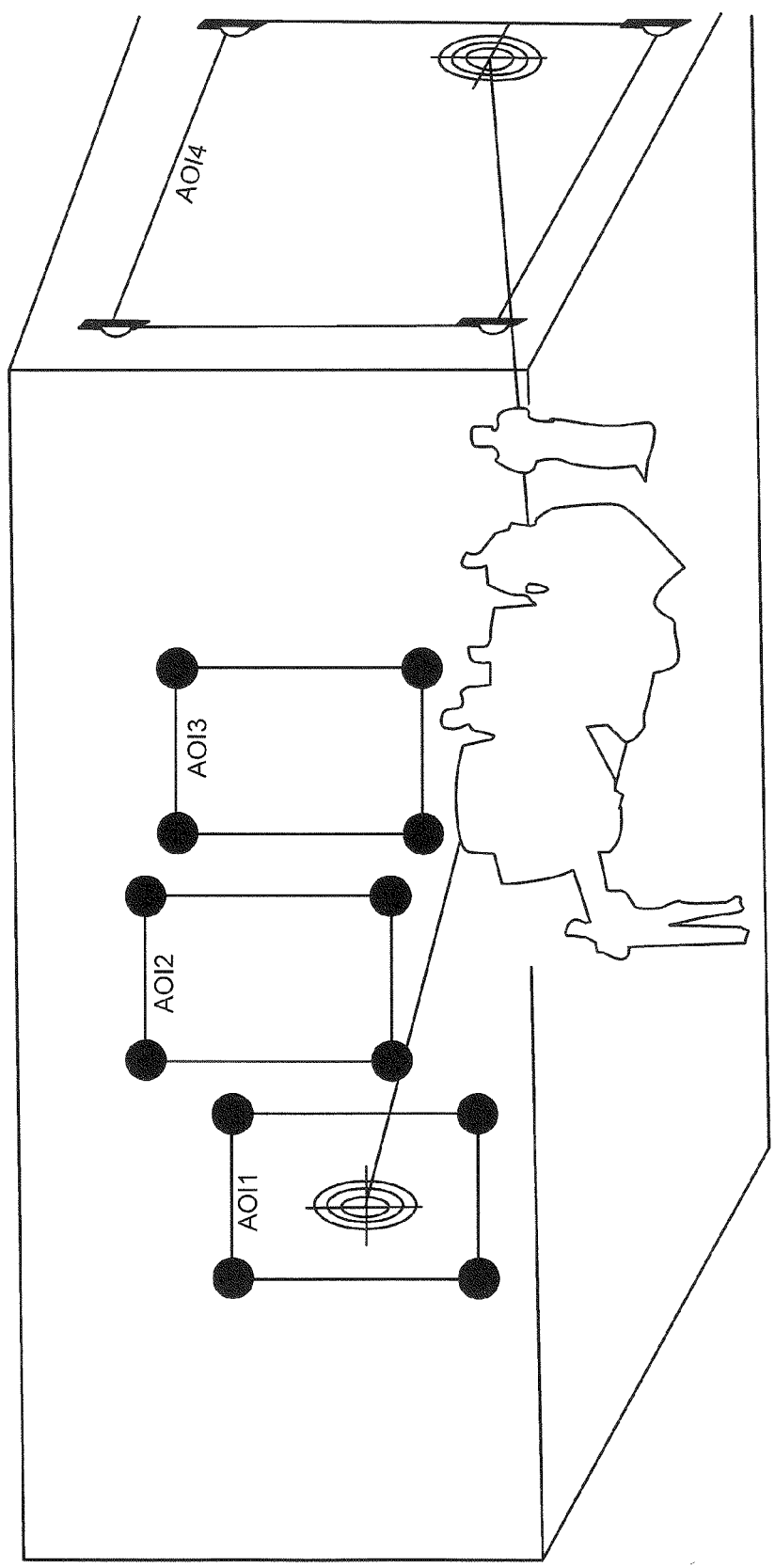
FIG. 2 illustrates a virtual training environment that includes walls having areas of interest, where the areas of interest are defined by area of interest markers, according to an embodiment of the invention.

In FIG. 2 we see a depiction of a virtual training environment with the augmentation of the environment with AIMs on the surrounding walls, where the AIMs define areas of interest AOI1 through AOI4. The PTDs can be mounted on HMDs, weapons, scopes, and/or binoculars. This allows for the generation of perspective-based imagery for trainees using such devices.

PTD devices may be enhanced using accelerometers, gyroscopes and magnetometers to detect orientation. PTDs enhanced in this manner would calibrate these devices during times of image-based track lock, then use them to extrapolate orientation and position when track lock is not possible. Various weighted methods to combine the diverse orientation information may be employed to improve accuracy (such as combining accelerometer and gyroscope information to yield motion and orientation in 6DOF).

AOIs are delineated using infrared point light emitters that identify points on the AOI (e.g., corners) as well as the spatial position, orientation and size of the AOI. AOIs may overlap in physical space either on parallel planes or orthogonal planes. AOIs exist to provide precise locations in the field of view, areas of projected blue-screen imagery, or high accuracy aim-point data areas. More than one emitter may be used to delimit an AOI point. This allows the determination of an AOI's orientation, even though its corners or sides may be occluded.

In a three dimensional environment, AOIs are defined where high accuracy tracking of perspective is required. These AOIs may be two-dimensional polygonal regions where each vertex is marked by an emitter. Emitters may be infrared LEDs which are visible to tracking imaging systems. Each emitter source identifies a point in three dimensions in a bounded volume. A PTD detects emitters within its field of view and uses the relationships of the emitters to determine a current perspective in three dimensions.

The PTD's processor identifies each emitter and determines its physical spatial relationship to other emitters based on the emitter's unique identification coding. In some embodiments of the invention, each TPA emitter uniquely identifies itself to the system by modulating its light output isochronously to the system image capture frame rate. Within a given TPA emitter array modulation may be sent synchronously (i.e., all emitters at once), although each emitter's message may be unique. The emitter identification coding can be modulated at or near the video frame rate, allowing the PTD processor to detect the emitter's coding pattern. The identification coding may include error correction and validation sequences. The emitters of a TPA may be synchronized to the PTD using wireless communication. A TPA's IR emissions may be shortened and sent only during the peak sensitivity of the PTD sensor. Modulation of an emitter would then consist of dropping pulses during this period on a low-duty cycle basis.

The PTD computes a solution for perspective based on each emitter's location in the captured image field. Equations of motion are generated to allow the PTD to compute perspective during times of emitter occlusion. The PTD may use a secondary system to synchronize to an AOI's TPA. For example, a wireless connection may be used to signal the start of a point source modulation so that it may be synchronous with the video capture and allow for point source identity to be demodulated.

Three or more emitters can be used to define a two-dimensional surface having a polygonal outline. An n-sided polygon is defined using n or more emitters. Over-specification of the TPA outline can be used to improve accuracy and to compensate for occlusion of corner emitters.

A TPA may be implemented using an IR emitter and a micro-processor, or using an IR emitter and a programmed logic array. A TPA may also be implemented using an IR emitter and a memory cell used to replay the source IR through the emitter. A TPA may be permanently integrated into a device for use in an arena tracking environment.

Figure 3:
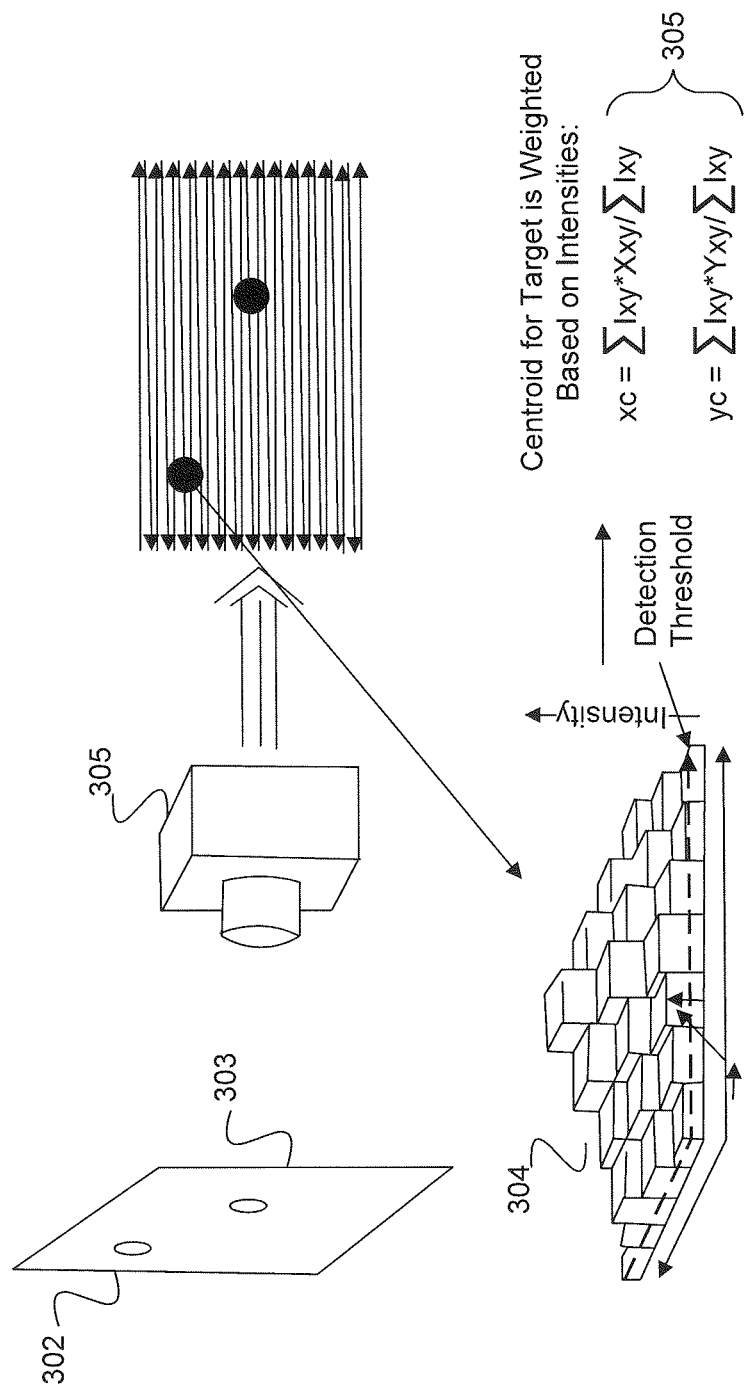
FIG. 3 illustrates a perspective tracking device detecting an emitter and determining the centroid of the emitter, according to an embodiment of the invention.

In FIG. 3 we see an approach for computing the location of an emitter in a PTD field of view. In this view we see a PTD (301) observing two emitters (302, 303). Each emitter light source is perceived by the PTD as a heightened area of sensed light intensity in a bounded area of the digitized field of view. Since the image is sampled using discrete sensor cells, the center of an emitter's image is located by finding the "center" of the light source, or centroid, according to the calculations shown at 305. The pixels of a point light emitter must also be distinguished from its background. To do this, the cells used to compute an emitter's centroid are sorted according to the amplitude detected at each cell (304). They may also sorted on the basis of the location of the pixels, given the size and shape of the grouping of pixels.

Corrections may be applied to the computation of this centroid. The first of these corrections is a temperature-based offset of intensity amplitude on a per cell basis. The second compensation is the exact X:Y location of each cell, based on corrections for errors in the optics inherent in the PTD device. These corrections are applied locally, prior to the centroid computation being made for each emitter's centroid. The final emitter centroid is translated into an offset angle from the center of the PTD field of view.

Figure 4:
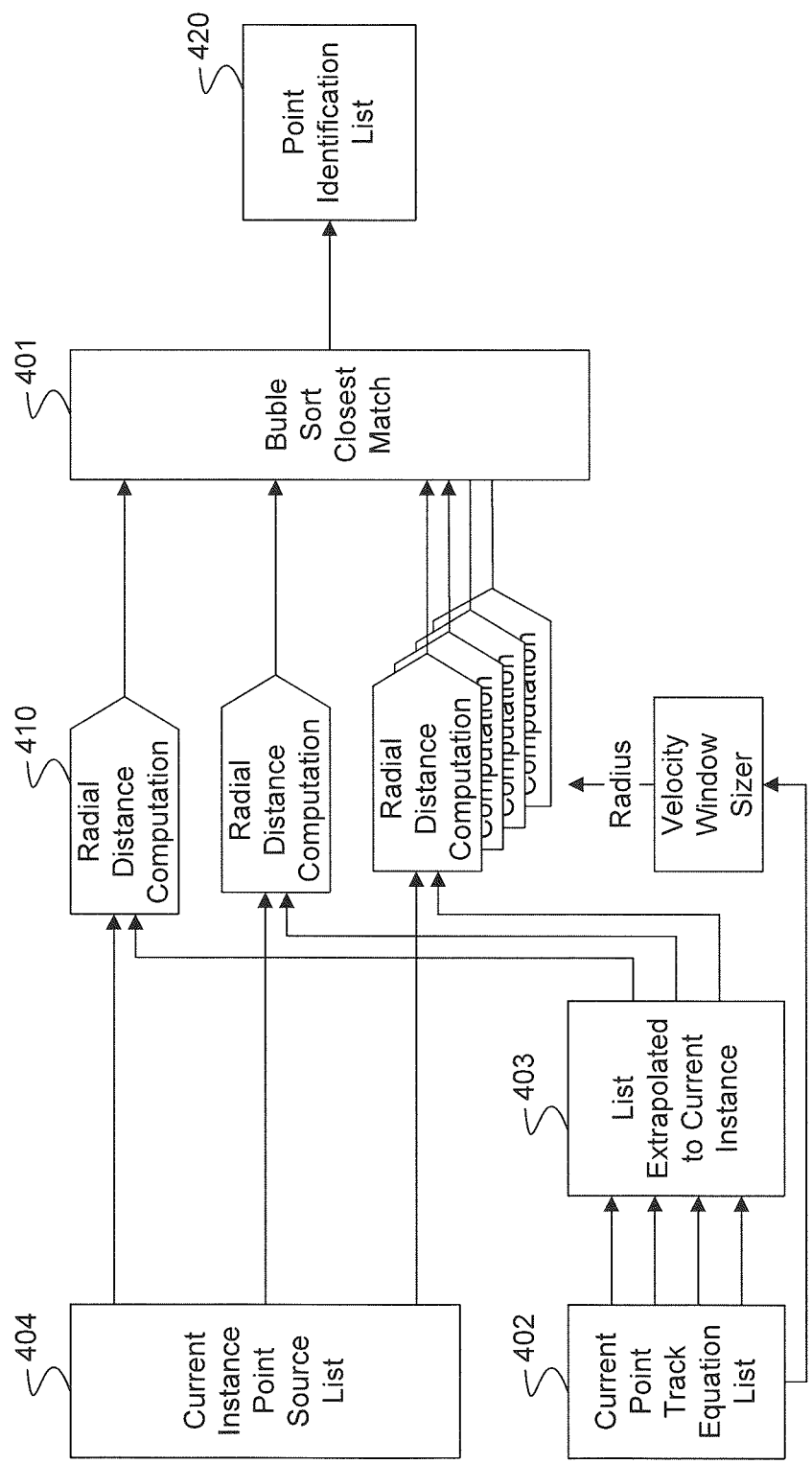
FIG. 4 illustrates the identification of point light emitters using a bubble sort, according to an embodiment of the invention.

In FIG. 4, an emitter centroid is established for more than one frame period. Then a process of identifying the emitters is begun. To this end, a radial bubble sort (401) can be employed to re-identify the emitter on each successive frame. In FIG. 4, the steps in this process are outlined. The invention utilizes a local data analysis capability in reduction of image data to perspective angles and coordinates. This data may be further reduced to precise equations of motion. These motion formulae (402) are communicated to a virtual world generation process, where the formulae are used to compute instantaneous position orientation by extrapolation of the motion formulae (403). The reduction process may be either centralized or distributed.

On each frame, motion equations for each known emitter are advanced to the current time (404). The predicted positions are then compared to detected positions (403) using radial distance computations (410) and sorted using a radial bubble sort (401) to yield a best fit. When a radial distance match occurs within some predefined tolerance, the emitter history and equations are updated for the next frame. The result is a new point identification list (420). If an emitter centroid falls out of the maximum allowed radius then it is assumed to be a new emitter and a new set of equations are started. When an emitter is not detected on a given frame, the equations are coasted and the emitter's entry is marked as modulated. Emitter equations are coasted for a fixed number of frames then deleted as a valid entry.

Figure 5:
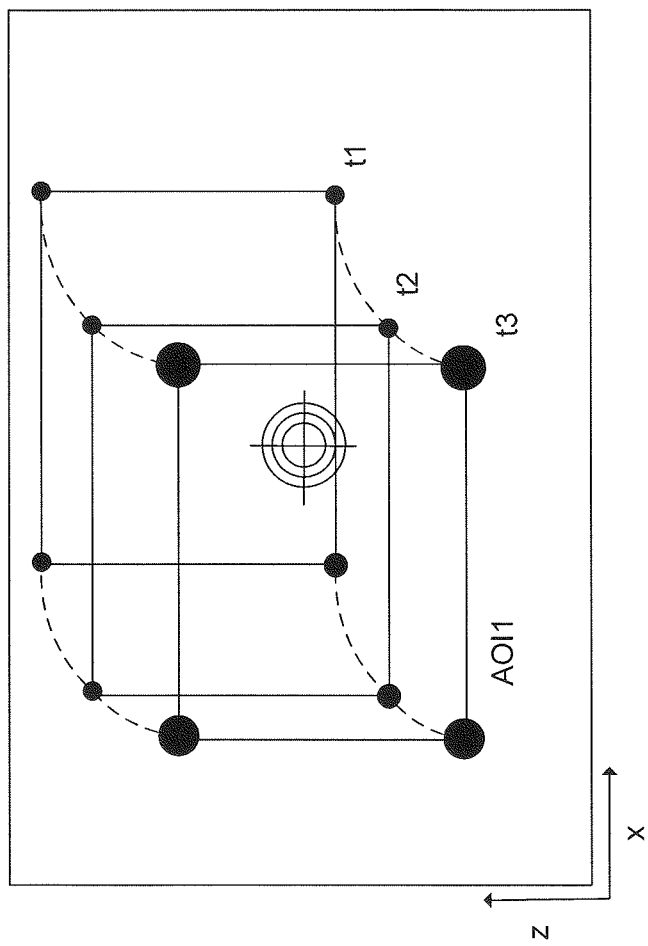
FIG. 5 illustrates the motion of a set of area of interest markers over time, as captured in a sequence of video frames, according to an embodiment of the invention.
Figure 6:
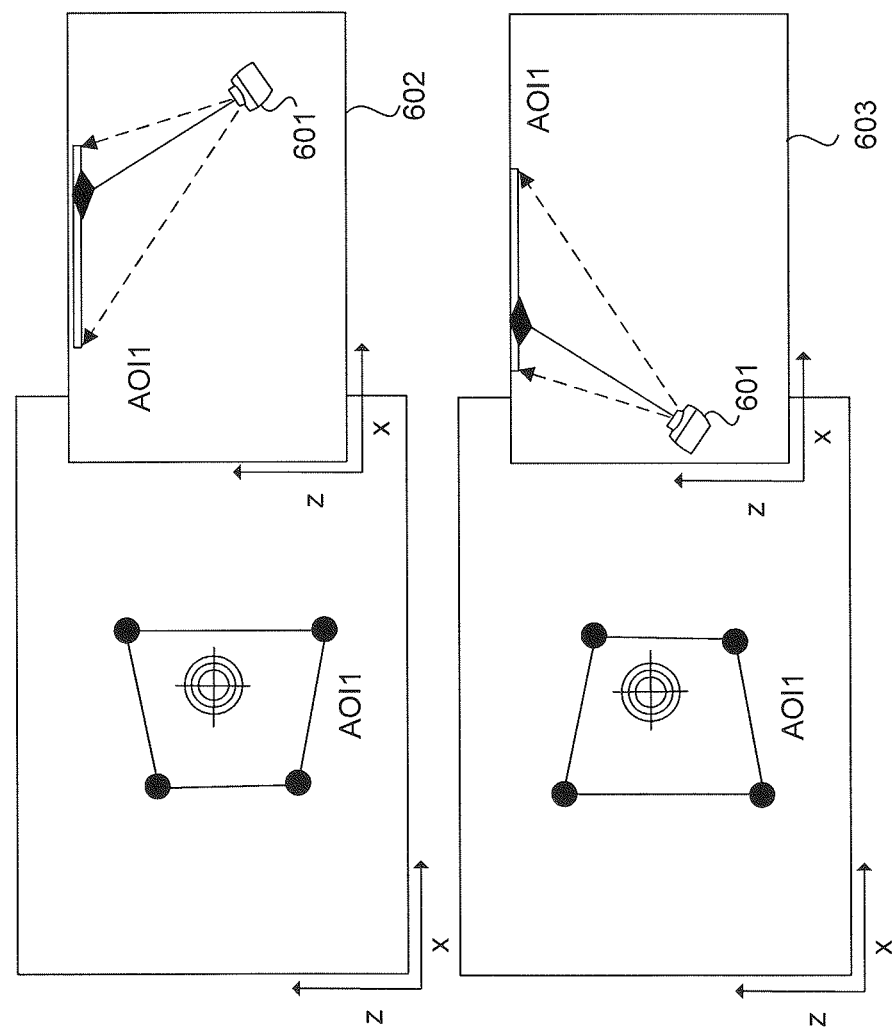
FIG. 6 illustrates changes in the perceived orientation of an area of interest as the viewing angle changes, according to an embodiment of the invention.

Once individual emitters have been identified, the AOI to which they belong may be determined. This may be seen in FIG. 5. The AOI description describes the virtual locations of each emitter in the physical array. Depending on which TPA emitters have been detected, the angular separation of the emitters may then be used to determine the location and perspective of the PTD. This process may be better understood by observing FIGS. 5 and 6. In FIG. 5, we can see that on successive capture frames, at times t1, t2 and t3, the TPA emitters have changed position in the captured field, yet retain their physical location relationships. In FIG. 6 we can see the changes in the geometric relationships of a four point TPA as PTD 601 detects it from the right (602) and left (603) sides. Solution of position and perspective may be derived from the viewed TPA emitter relationships using relatively simple geometric rotations and reduction.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A perspective tracking system comprising:
   a computer-based perspective tracking device; and
   an array of emitters configured to define at least one area of interest based on emitted signals from at least two emitters in the array of emitters;
   wherein the computer-based perspective tracking device is configured to determine a spatial position, orientation, and size of the area of interest based on the emitted signals from the array of emitters;
   wherein the computer-based perspective tracking device is configured to capture a plurality of image frames of said at least one area of interest;
   wherein the computer-based perspective tracking system is configured to analyze said plurality of image frames to determine a motion formulae of the computer-based perspective tracking device, and
   wherein the computer-based perspective tracking system is configured to measure a light intensity of each of the at least two emitters in the array of emitters over a detection threshold and apply a correction equation to the light intensity measurement that yields temperature-based offsets.

2. The system of claim 1 wherein at least one emitter in the array of emitters comprises a light emitter.

3. The system of claim 2 wherein said at least one emitter in the array of emitters is configured to modulate the light to output an identification of said light emitter.

4. The system of claim 3 wherein said identification comprises one or more of:
   an identification sequence;
   an error correction; and
   a validation sequence.

5. The system of claim 1 wherein said at least one area of interest comprises an n-sided polygon defined by said array of emitters.

6. The system of claim 1 wherein said spatial position, orientation, and size comprise:
   point of gaze; or
   point of aim.

7. The system of claim 1, wherein the perspective tracking system is configured to determine the motion formulae in six degrees of freedom.

8. The system of claim 7 wherein said determining by the perspective tracking system comprises the use of one or more of:
   an accelerometer;
   a gyroscope; and
   a magnetometer.

9. The system of claim 1 wherein said computer-based perspective tracking device and at least one emitter of the array of emitters are configured to communicate wirelessly.

10. A perspective tracking method comprising:
    capturing, using a computer-based system, a first image frame wherein said first image frame includes a first location of a first emitter and a first location of a second emitter;
    determining, using the computer-based system, a first area of interest based on the first location of the first emitter and the first location of the second emitter;
    determining, based on the first locations of the first and second emitters, a spatial position, an orientation, and a size of the first area of interest;
    capturing, using the computer-based system, a second image frame wherein said second image frame includes a second location of said first emitter and a second location of said second emitter;
    determining, using the computer-based system, a second area of interest based on the second location of the first emitter and the second location of the second emitter;
    determining, based on the second locations of the first and second emitters, a spatial position, an orientation, and a size of the second area of interest; and
    determining a motion characteristic of the first and second emitters,
    wherein the capture of each image frame comprises measuring a light intensity of each of the first and second emitters over a detection threshold and applying a correction equation to the light intensity measurement that yields temperature-based offsets.

11. The method of claim 10, wherein the capture of each image frame further comprises
    calculating a centroid of the light intensity of each of the first and second emitters.

12. The method of claim 10, wherein:
    said first image capturing step further comprises capturing said first image frame wherein said first image frame includes a first location of a third emitter;
    said first determining step comprises determining said first area of interest based on the first location of each of the first, second, and third emitters;
    said second image capturing step further comprises capturing said second image frame wherein said second image frame includes a second location of said third emitter; and
    said second determining step comprises determining said second area of interest based on the second location of each of the first, second and third emitters.

13. A computer program product comprising a non-transitory computer usable medium having control logic stored therein for causing a computer to track a movement and a perspective of an array of emitters, the control logic comprising:
    first computer readable program code for causing the computer to capture a first image frame wherein said first image frame includes a first location of a first emitter and a first location of a second emitter;

second computer readable program code for causing the computer to determine a first area of interest based on the first location of the first emitter and the first location of the second emitter;

third computer readable program code for causing the computer to determine, based on the first locations of the first and second emitters, a spatial position, an orientation, and a size of the first area of interest;

fourth computer readable program code for causing the computer to capture a second image frame wherein said second image frame includes a second location of said first emitter and a second location of said second emitter;

fifth computer readable program code for causing the computer to determine a second area of interest based on the second location of the first emitter and the second location of the second emitter;

sixth computer readable program code fir causing the computer to determine, based on the second locations of the first and second emitters, a spatial position, an orientation, and a size of the second area of interest; and seventh computer readable program code for causing the computer to determine a motion characteristic of the first and second emitters, wherein each of the first and fourth computer readable program code comprises:

computer readable program code for causing the computer to measure a light intensity of each of the first and second emitters over a detection threshold; and computer readable program code for causing the computer to apply a correction equation to the light intensity measurement that yields temperature-based offsets.

14. The computer program product of claim 13, wherein each of the first and fourth computer readable program code further comprises:

computer readable program code for causing the computer to calculate a centroid of the light intensity of each of the first and second emitters.

15. The computer program product of claim 13, wherein said correction equation yields an optical error correction.

* * * * *